United States Patent
Whitesides

(10) Patent No.: US 9,964,831 B2
(45) Date of Patent: May 8, 2018

(54) ELECTRO-OPTIC ASSEMBLIES, AND ADHESIVES AND BINDERS FOR USE THEREIN

(71) Applicant: E Ink Corporation, Billerica, MA (US)

(72) Inventor: Thomas H. Whitesides, Victoria (CA)

(73) Assignee: E Ink Corporation, Billerica, MA (US)

( * ) Notice: Subject to any disclaimer, the term of this patent is extended or adjusted under 35 U.S.C. 154(b) by 307 days.

(21) Appl. No.: 15/053,283

(22) Filed: Feb. 25, 2016

(65) Prior Publication Data

US 2016/0170282 A1   Jun. 16, 2016

Related U.S. Application Data

(62) Division of application No. 12/264,696, filed on Nov. 4, 2008, now abandoned.

(Continued)

(51) Int. Cl.
*G02F 1/167* (2006.01)
*C08G 18/10* (2006.01)
(Continued)

(52) U.S. Cl.
CPC ......... *G02F 1/167* (2013.01); *C08G 18/0814* (2013.01); *C08G 18/0823* (2013.01); *C08G 18/10* (2013.01); *C08G 18/12* (2013.01); *C08G 18/4825* (2013.01); *C08G 18/6692* (2013.01); *C08G 18/765* (2013.01); *C09D 5/4465* (2013.01); *C09J 7/38* (2018.01);
(Continued)

(58) Field of Classification Search
CPC .............................. G02F 1/167; C08G 18/0814
USPC ........................................................ 359/265
See application file for complete search history.

(56) References Cited

U.S. PATENT DOCUMENTS 3,668,106 A   6/1972   Ota
3,756,693 A   9/1973   Ota
(Continued)

FOREIGN PATENT DOCUMENTS

EP   1099207   5/2001
EP   1145072   10/2001
(Continued)

OTHER PUBLICATIONS

United States Patent and Trademark Office; PCT/US2008/082439; International Search Report and Written Opinion; dated Dec. 22, 2008, dated Dec. 22, 2008.
(Continued)

*Primary Examiner* — Zachary Wilkes
(74) *Attorney, Agent, or Firm* — David J. Cole

(57) ABSTRACT

An electro-optic assembly comprises an adhesive layer and a layer of electro-optic material. The adhesive layer comprises a polymeric adhesive material and an ionic material having either its cation or its anion fixed to the polymeric adhesive material. The ionic material reduces the volume resistivity of the polymeric adhesive material and is not removed upon heating to 50° C. In a similar electro-optic assembly comprising an adhesive layer and a layer of electro-optic material, the adhesive layer comprises a polymeric adhesive material which has been subjected to dialysis or diafiltration to remove organic species having a molecular weight less than about 3,500, so that the adhesive material has a content of N-methylpyrrolidone not exceeding 500 ppm based upon the total weight of the adhesive layer and layer of electro-optic material.

14 Claims, 2 Drawing Sheets

Related U.S. Application Data

(60) Provisional application No. 60/987,876, filed on Nov. 14, 2007.

(51) Int. Cl.

| | | |
|---|---|---|
| *C08G 18/48* | (2006.01) | |
| *C08G 18/08* | (2006.01) | |
| *C09D 5/44* | (2006.01) | |
| *C08G 18/12* | (2006.01) | |
| *C08G 18/66* | (2006.01) | |
| *C08G 18/76* | (2006.01) | |
| *C09J 9/02* | (2006.01) | |
| *C09J 175/04* | (2006.01) | |
| *G02F 1/153* | (2006.01) | |
| *C08K 5/00* | (2006.01) | |
| *C08K 5/19* | (2006.01) | |
| *C08K 5/49* | (2006.01) | |
| *G02F 1/1334* | (2006.01) | |

(52) U.S. Cl.
CPC .............. *C09J 9/02* (2013.01); *C09J 175/04* (2013.01); *G02F 1/1533* (2013.01); *C08G 2170/80* (2013.01); *C08K 5/0075* (2013.01); *C08K 5/19* (2013.01); *C08K 5/49* (2013.01); *C09J 2205/102* (2013.01); *C09J 2475/00* (2013.01); *G02F 1/1334* (2013.01); *G02F 2001/1672* (2013.01); *G02F 2202/28* (2013.01)

(56) References Cited

U.S. PATENT DOCUMENTS

| | | | |
|---|---|---|---|
| 3,767,392 | A | 10/1973 | Ota |
| 3,792,308 | A | 2/1974 | Ota |
| 3,870,517 | A | 3/1975 | Ota et al. |
| 3,892,568 | A | 7/1975 | Ota |
| 4,418,346 | A | 11/1983 | Batchelder |
| 4,448,493 | A | 5/1984 | Matsudaira et al. |
| 4,550,982 | A | 11/1985 | Hirai |
| 5,745,094 | A | 4/1998 | Gordon, II et al. |
| 5,760,761 | A | 6/1998 | Sheridon |
| 5,777,782 | A | 7/1998 | Sheridon |
| 5,784,190 | A | 7/1998 | Worley |
| 5,808,783 | A | 9/1998 | Crowley |
| 5,872,552 | A | 2/1999 | Gordon, II |
| 5,891,366 | A | 4/1999 | Gruenwald et al. |
| 5,930,026 | A | 7/1999 | Jacobson |
| 5,961,804 | A | 10/1999 | Jacobson |
| 6,017,584 | A | 1/2000 | Albert |
| 6,054,071 | A | 4/2000 | Mikkelsen, Jr. |
| 6,055,091 | A | 4/2000 | Sheridon |
| 6,067,185 | A | 5/2000 | Albert |
| 6,097,531 | A | 8/2000 | Sheridon |
| 6,118,426 | A | 9/2000 | Albert |
| 6,120,588 | A | 9/2000 | Jacobson |
| 6,120,839 | A | 9/2000 | Comiskey |
| 6,124,851 | A | 9/2000 | Jacobson |
| 6,128,124 | A | 10/2000 | Silverman |
| 6,130,773 | A | 10/2000 | Jacobson |
| 6,130,774 | A | 10/2000 | Albert |
| 6,137,467 | A | 10/2000 | Sheridon |
| 6,140,405 | A | 10/2000 | Eckstein et al. |
| 6,144,361 | A | 11/2000 | Gordon, II |
| 6,147,791 | A | 11/2000 | Sheridon |
| 6,171,522 | B1 | 1/2001 | Michot et al. |
| 6,172,798 | B1 | 1/2001 | Albert |
| 6,177,921 | B1 | 1/2001 | Comiskey |
| 6,184,331 | B1 | 2/2001 | Chiang et al. |
| 6,184,856 | B1 | 2/2001 | Gordon, II |
| 6,225,971 | B1 | 5/2001 | Gordon, II |
| 6,232,950 | B1 | 5/2001 | Albert |
| 6,241,921 | B1 | 6/2001 | Jacobson |
| 6,249,271 | B1 | 6/2001 | Albert |
| 6,252,564 | B1 | 6/2001 | Albert |
| 6,262,706 | B1 | 7/2001 | Albert |
| 6,262,833 | B1 | 7/2001 | Loxley |
| 6,271,823 | B1 | 8/2001 | Gordon, II |
| 6,300,932 | B1 | 10/2001 | Albert |
| 6,301,038 | B1 | 10/2001 | Fitzmaurice |
| 6,312,304 | B1 | 11/2001 | Duthaler |
| 6,312,971 | B1 | 11/2001 | Amundson |
| 6,323,989 | B1 | 11/2001 | Jacobson |
| 6,327,072 | B1 | 12/2001 | Comiskey |
| 6,376,828 | B1 | 4/2002 | Comiskey |
| 6,377,387 | B1 | 4/2002 | Duthaler |
| 6,392,785 | B1 | 5/2002 | Albert |
| 6,392,786 | B1 | 5/2002 | Albert |
| 6,413,790 | B1 | 7/2002 | Duthaler |
| 6,422,687 | B1 | 7/2002 | Jacobson |
| 6,445,374 | B1 | 9/2002 | Albert |
| 6,445,489 | B1 | 9/2002 | Jacobson et al. |
| 6,459,418 | B1 | 10/2002 | Comiskey |
| 6,473,072 | B1 | 10/2002 | Comiskey |
| 6,480,182 | B2 | 11/2002 | Turner |
| 6,498,114 | B1 | 12/2002 | Amundson |
| 6,504,524 | B1 | 1/2003 | Gates |
| 6,506,438 | B2 | 1/2003 | Duthaler |
| 6,512,354 | B2 | 1/2003 | Jacobson |
| 6,515,649 | B1 | 2/2003 | Albert |
| 6,518,949 | B2 | 2/2003 | Drzaic |
| 6,521,489 | B2 | 2/2003 | Duthaler et al. |
| 6,531,997 | B1 | 3/2003 | Gates |
| 6,535,197 | B1 | 3/2003 | Comiskey |
| 6,538,801 | B2 | 3/2003 | Jacobson |
| 6,545,291 | B1 | 4/2003 | Amundson |
| 6,580,545 | B2 | 6/2003 | Morrison |
| 6,639,578 | B1 | 10/2003 | Comiskey |
| 6,652,075 | B2 | 11/2003 | Jacobson |
| 6,657,772 | B2 | 12/2003 | Loxley |
| 6,664,944 | B1 | 12/2003 | Albert |
| D485,294 | S | 1/2004 | Albert |
| 6,672,921 | B1 | 1/2004 | Liang et al. |
| 6,680,725 | B1 | 1/2004 | Jacobson |
| 6,683,333 | B2 | 1/2004 | Kazlas |
| 6,693,620 | B1 | 2/2004 | Herb |
| 6,704,133 | B2 | 3/2004 | Gates |
| 6,710,540 | B1 | 3/2004 | Albert |
| 6,721,083 | B2 | 4/2004 | Jacobson |
| 6,724,519 | B1 | 4/2004 | Comiskey |
| 6,727,881 | B1 | 4/2004 | Albert |
| 6,738,050 | B2 | 5/2004 | Comiskey |
| 6,750,473 | B2 | 6/2004 | Amundson |
| 6,753,999 | B2 | 6/2004 | Zehner |
| 6,788,449 | B2 | 9/2004 | Liang |
| 6,816,147 | B2 | 11/2004 | Albert |
| 6,819,471 | B2 | 11/2004 | Amundson |
| 6,822,782 | B2 | 11/2004 | Honeyman |
| 6,825,068 | B2 | 11/2004 | Denis |
| 6,825,829 | B1 | 11/2004 | Albert |
| 6,825,970 | B2 | 11/2004 | Goenaga |
| 6,831,769 | B2 | 12/2004 | Holman |
| 6,839,158 | B2 | 1/2005 | Albert |
| 6,842,167 | B2 | 1/2005 | Albert |
| 6,842,279 | B2 | 1/2005 | Amundson |
| 6,842,657 | B1 | 1/2005 | Drzaic |
| 6,864,875 | B2 | 3/2005 | Drzaic |
| 6,865,010 | B2 | 3/2005 | Duthaler et al. |
| 6,866,760 | B2 | 3/2005 | Paolini, Jr. |
| 6,870,657 | B1 | 3/2005 | Fitzmaurice et al. |
| 6,870,661 | B2 | 3/2005 | Pullen et al. |
| 6,900,851 | B2 | 5/2005 | Morrison et al. |
| 6,922,276 | B2 | 7/2005 | Zhang et al. |
| 6,950,220 | B2 | 9/2005 | Abramson et al. |
| 6,958,848 | B2 | 10/2005 | Cao et al. |
| 6,967,640 | B2 | 11/2005 | Albert et al. |
| 6,980,196 | B2 | 12/2005 | Turner et al. |
| 6,982,178 | B2 | 1/2006 | LeCain et al. |
| 6,987,603 | B2 | 1/2006 | Paolini, Jr. et al. |
| 6,995,550 | B2 | 2/2006 | Jacobson |
| 7,002,728 | B2 | 2/2006 | Pullen et al. |
| 7,012,600 | B2 | 3/2006 | Zehner |
| 7,012,735 | B2 | 3/2006 | Honeyman et al. |
| 7,023,420 | B2 | 4/2006 | Comiskey et al. |

(56) References Cited

U.S. PATENT DOCUMENTS

| | | | |
|---|---|---|---|
| 7,030,412 B1 | 4/2006 | Drzaic et al. |
| 7,030,854 B2 | 4/2006 | Baucom et al. |
| 7,034,783 B2 | 4/2006 | Gates |
| 7,038,655 B2 | 5/2006 | Herb |
| 7,061,663 B2 | 6/2006 | Cao et al. |
| 7,071,913 B2 | 7/2006 | Albert |
| 7,075,502 B1 | 7/2006 | Drzaic |
| 7,075,703 B2 | 7/2006 | O'Neil et al. |
| 7,079,305 B2 | 7/2006 | Paolini, Jr. et al. |
| 7,106,296 B1 | 9/2006 | Jacobson |
| 7,109,968 B2 | 9/2006 | Albert et al. |
| 7,110,163 B2 | 9/2006 | Webber et al. |
| 7,110,164 B2 | 9/2006 | Paolini, Jr. et al. |
| 7,116,318 B2 | 10/2006 | Amundson et al. |
| 7,116,466 B2 | 10/2006 | Whitesides et al. |
| 7,119,759 B2 | 10/2006 | Zehner et al. |
| 7,119,772 B2 | 10/2006 | Amundson |
| 7,148,128 B2 | 12/2006 | Jacobson |
| 7,166,182 B2 | 1/2007 | Pereira |
| 7,167,155 B1 | 1/2007 | Albert et al. |
| 7,170,670 B2 | 1/2007 | Webber |
| 7,173,752 B2 | 2/2007 | Doshi et al. |
| 7,176,880 B2 | 2/2007 | Amundson et al. |
| 7,180,649 B2 | 2/2007 | Morrison et al. |
| 7,190,008 B2 | 3/2007 | Amundson et al. |
| 7,193,625 B2 | 3/2007 | Danner et al. |
| 7,202,847 B2 | 4/2007 | Gates |
| 7,202,991 B2 | 4/2007 | Zhang et al. |
| 7,206,119 B2 | 4/2007 | Honeyman et al. |
| 7,223,672 B2 | 5/2007 | Kazlas et al. |
| 7,230,750 B2 | 6/2007 | Whitesides |
| 7,230,751 B2 | 6/2007 | Whitesides et al. |
| 7,236,290 B1 | 6/2007 | Zhang et al. |
| 7,236,291 B2 | 6/2007 | Kaga et al. |
| 7,236,292 B2 | 6/2007 | LeCain |
| 7,242,513 B2 | 7/2007 | Albert et al. |
| 7,247,379 B2 | 7/2007 | Pullen et al. |
| 7,256,766 B2 | 8/2007 | Albert et al. |
| 7,259,744 B2 | 8/2007 | Arango |
| 7,280,094 B2 | 10/2007 | Albert |
| 7,304,634 B2 | 12/2007 | Albert et al. |
| 7,304,787 B2 | 12/2007 | Whitesides et al. |
| 7,312,784 B2 | 12/2007 | Baucom et al. |
| 7,312,794 B2 | 12/2007 | Zehner |
| 7,312,916 B2 | 12/2007 | Pullen |
| 7,321,459 B2 | 1/2008 | Masuda et al. |
| 7,327,511 B2 | 2/2008 | Whitesides et al. |
| 7,339,715 B2 | 3/2008 | Webber et al. |
| 7,342,068 B2 | 3/2008 | Klingenberg |
| 7,349,148 B2 | 3/2008 | Doshi et al. |
| 7,352,353 B2 | 4/2008 | Albert |
| 7,365,394 B2 | 4/2008 | Denis et al. |
| 7,365,733 B2 | 4/2008 | Denis et al. |
| 7,369,299 B2 | 5/2008 | Sakurai et al. |
| 7,375,875 B2 | 5/2008 | Whitesides |
| 7,382,363 B2 | 6/2008 | Albert et al. |
| 7,388,572 B2 | 6/2008 | Duthaler et al. |
| 7,391,555 B2 | 6/2008 | Albert et al. |
| 7,411,719 B2 | 8/2008 | Paolini, Jr. et al. |
| 7,411,720 B2 | 8/2008 | Honeyman et al. |
| 7,420,549 B2 | 9/2008 | Jacobson |
| 7,442,587 B2 | 10/2008 | Amundson et al. |
| 7,443,571 B2 | 10/2008 | LeCain et al. |
| 7,453,445 B2 | 11/2008 | Amundson |
| 7,476,981 B2 | 1/2009 | Bergmann |
| 7,477,444 B2 | 1/2009 | Cao et al. |
| 7,492,339 B2 | 2/2009 | Amundson |
| 7,492,497 B2 | 2/2009 | Paolini, Jr. |
| 7,513,813 B2 | 4/2009 | Paolini, Jr. et al. |
| 7,528,822 B2 | 5/2009 | Amundson |
| 7,532,388 B2 | 5/2009 | Whitesides et al. |
| 7,535,624 B2 | 5/2009 | Amundson et al. |
| 7,545,358 B2 | 6/2009 | Gates et al. |
| 7,551,346 B2 | 6/2009 | Fazel |
| 7,554,712 B2 | 6/2009 | Patry et al. |
| 7,560,004 B2 | 7/2009 | Pereira |
| 7,561,324 B2 | 7/2009 | Duthaler et al. |
| 7,583,251 B2 | 9/2009 | Arango |
| 7,583,427 B2 | 9/2009 | Danner |
| 7,598,173 B2 | 10/2009 | Ritenour |
| 7,602,374 B2 | 10/2009 | Zehner et al. |
| 7,605,799 B2 | 10/2009 | Amundson et al. |
| 7,612,760 B2 | 11/2009 | Kawai |
| 7,636,191 B2 | 12/2009 | Duthaler |
| 7,646,530 B2 | 1/2010 | Takagi et al. |
| 7,649,666 B2 | 1/2010 | Isobe et al. |
| 7,649,674 B2 | 1/2010 | Danner |
| 7,667,684 B2 | 2/2010 | Jacobson et al. |
| 7,667,886 B2 | 2/2010 | Danner |
| 7,672,040 B2 | 3/2010 | Sohn |
| 7,679,599 B2 | 3/2010 | Kawai |
| 7,679,814 B2 | 3/2010 | Paolini, Jr. et al. |
| 7,688,297 B2 | 3/2010 | Zehner et al. |
| 7,688,497 B2 | 3/2010 | Danner |
| 7,705,823 B2 | 4/2010 | Nihei |
| 7,705,824 B2 | 4/2010 | Baucom et al. |
| 7,728,811 B2 | 6/2010 | Albert et al. |
| 7,729,039 B2 | 6/2010 | LeCain et al. |
| 7,733,311 B2 | 6/2010 | Amundson |
| 7,733,335 B2 | 6/2010 | Zehner et al. |
| 7,733,554 B2 | 6/2010 | Danner et al. |
| 7,746,544 B2 | 6/2010 | Comiskey |
| 7,785,988 B2 | 8/2010 | Amundson |
| 7,787,169 B2 | 8/2010 | Abramson et al. |
| 7,791,789 B2 | 9/2010 | Albert |
| 7,826,129 B2 | 11/2010 | Wu |
| 7,839,564 B2 | 11/2010 | Whitesides et al. |
| 7,843,621 B2 | 11/2010 | Danner et al. |
| 7,843,624 B2 | 11/2010 | Danner |
| 7,848,006 B2 | 12/2010 | Wilcox |
| 7,848,007 B2 | 12/2010 | Paolini, Jr. |
| 7,859,637 B2 | 12/2010 | Amundson et al. |
| 7,893,435 B2 | 2/2011 | Kazlas et al. |
| 7,903,319 B2 | 3/2011 | Honeyman |
| 7,910,175 B2 | 3/2011 | Webber |
| 7,952,557 B2 | 5/2011 | Amundson et al. |
| 7,952,790 B2 | 5/2011 | Honeyman |
| 7,956,841 B2 | 6/2011 | Albert |
| 7,999,787 B2 | 8/2011 | Amundson |
| 8,009,348 B2 | 8/2011 | Zehner |
| 8,018,640 B2 | 9/2011 | Whitesides |
| 8,034,209 B2 | 10/2011 | Danner |
| 8,035,886 B2 | 10/2011 | Jacobson |
| 8,064,962 B2 | 11/2011 | Wilcox et al. |
| 8,077,141 B2 | 12/2011 | Duthaler |
| 8,089,453 B2 | 1/2012 | Comiskey |
| 8,115,729 B2 | 2/2012 | Danner |
| 8,125,501 B2 | 2/2012 | Amundson |
| 8,129,655 B2 | 3/2012 | Jacobson et al. |
| 8,139,050 B2 | 3/2012 | Jacobson et al. |
| 8,174,490 B2 | 5/2012 | Whitesides |
| 8,177,942 B2 | 5/2012 | Paolini, Jr. |
| 8,289,250 B2 | 10/2012 | Zehner |
| 8,300,006 B2 | 10/2012 | Zhou |
| 8,319,759 B2 | 11/2012 | Jacobson |
| 8,384,658 B2 | 2/2013 | Albert |
| 8,390,301 B2 | 3/2013 | Danner |
| 8,390,918 B2 | 3/2013 | Wilcox |
| 8,466,852 B2 | 6/2013 | Drzaic |
| 8,482,835 B2 | 7/2013 | LeCain |
| 8,610,988 B2 | 12/2013 | Zehner et al. |
| 8,928,562 B2 | 1/2015 | Gates et al. |
| 2001/0014420 A1 | 8/2001 | Takeuchi |
| 2002/0027635 A1 | 3/2002 | Sakamaki |
| 2002/0060321 A1 | 5/2002 | Kazlas |
| 2002/0090980 A1 | 7/2002 | Wilcox et al. |
| 2003/0102858 A1 | 6/2003 | Jacobson et al. |
| 2004/0060635 A1 | 4/2004 | Diepers |
| 2004/0105036 A1 | 6/2004 | Danner et al. |
| 2004/0119681 A1 | 6/2004 | Albert et al. |
| 2005/0012980 A1 | 1/2005 | Wilcox et al. |
| 2005/0122306 A1 | 6/2005 | Wilcox et al. |
| 2005/0122563 A1 | 6/2005 | Honeyman et al. |
| 2005/0156340 A1 | 7/2005 | Valianatos et al. |

(56) References Cited

U.S. PATENT DOCUMENTS

| | | |
|---|---|---|
| 2005/0253777 A1 | 11/2005 | Zehner et al. |
| 2005/0259068 A1 | 11/2005 | Nihei et al. |
| 2006/0087479 A1 | 4/2006 | Sakurai et al. |
| 2006/0087489 A1 | 4/2006 | Sakurai et al. |
| 2006/0176267 A1 | 8/2006 | Honeyman et al. |
| 2006/0209008 A1 | 9/2006 | Nihei et al. |
| 2006/0214906 A1 | 9/2006 | Kobayashi et al. |
| 2006/0231401 A1 | 10/2006 | Sakurai et al. |
| 2007/0052757 A1 | 3/2007 | Jacobson |
| 2007/0091417 A1 | 4/2007 | Cao et al. |
| 2007/0091418 A1 | 4/2007 | Danner et al. |
| 2007/0103427 A1 | 5/2007 | Zhou |
| 2007/0285385 A1 | 12/2007 | Albert |
| 2008/0024429 A1 | 1/2008 | Zehner |
| 2008/0024482 A1 | 1/2008 | Gates |
| 2008/0048970 A1 | 2/2008 | Drzaic |
| 2008/0130092 A1 | 6/2008 | Whitesides |
| 2008/0136774 A1 | 6/2008 | Harris |
| 2008/0291129 A1 | 11/2008 | Harris |
| 2009/0004442 A1 | 1/2009 | Danner |
| 2009/0009852 A1 | 1/2009 | Honeyman |

FOREIGN PATENT DOCUMENTS

| | | |
|---|---|---|
| WO | 2000038000 | 6/2000 |
| WO | WO2000036560 | 6/2000 |
| WO | WO2000067110 | 11/2000 |

OTHER PUBLICATIONS

European Patent Office; EP Appl. No. 08848692.3; Extended European Search Report; dated Jul. 3, 2014, dated Jul. 3, 2014.
Wood, D., "An Electrochromic Renaissance?" Information Display, 18(3), 24 (Mar. 2002) Mar. 1, 2002.
O'Regan, B. et al., "A Low Cost, High-efficiency Solar Cell Based on Dye-sensitized colloidal TiO2 Films", Nature, vol. 353, Oct. 24, 1991, 773-740 Oct. 24, 1991.
Bach, U., et al., "Nanomaterials-Based Electrochromics for Paper-Quality Displays", Adv. Mater, 14(11), 845 (2002) Jun. 5, 2002.
Kitamura, T., et al., "Electrical toner movement for electronic paper-like display", Asia Display/IDW '01, p. 1517, Paper HCS1-1 (2001) Jan. 1, 2001.
Yamaguchi, Y., et al., "Toner display using insulative particles charged triboelectrically", Asia Display/IDW '01, p. 1729, Paper AMD4-4 (2001) Jan. 1, 2001.
Chen, Y., et al., "A Conformable Electronic Ink Display using a Foil-Based a-Si TFT Array", SID 01 Digest, 157 (Jun. 2001) Jun. 30, 2001.
Comiskey, B., et al., "An electrophoretic ink for all-printed reflective electronic displays", Nature, 394, 253 (1998) Dec. 31, 1998.
Comiskey, B., et al., "Electrophoretic Ink: A Printable Display Material", SID 97 Digest (1997), p. 75 Dec. 31, 1997.
Drzaic, P., et al., "A Printed and Rollable Bistable Electronic Display", SID 98 Digest (1998), p. 1131 Dec. 31, 1998.
Duthaler, G., et al., "Active-Matrix Color Displays Using Electrophoretic Ink and Color Filters", SID 02 Digest, 1374 (2002) Dec. 31, 2002.
Jacobson, J., et al., "The last book", IBM Systems J., 36, 457 (1997) Dec. 31, 1997.
Jo, G-R, et al., "Toner Display Based on Particle Movements", Chem. Mater, 14, 664 (2002) Dec. 31, 2002.
Kazlas, P., et al., "12.1" SVGA Microencapsulated Electrophoretic Active Matrix Display for Information Applicances", SID 01 Digest, 152 (Jun. 2001) Jun. 30, 2001.
Pitt, M.G., et al., "Power Consumption of Microencapsulated Electrophoretic Displays for Smart Handheld Applications", SID 02 Digest, 1378 (2002) Dec. 31, 2002.
Webber, R., "Image Stability in Active-Matrix Microencapsulated Electrophoretic Displays", SID 02 Digest, 126 (2002) Dec. 31, 2002.
Zehner, R. et al., "Drive Waveforms for Active Matrix Electrophoretic Displays", SID 03 Digest, 842 (2003) Dec. 31, 2003.
Amundson, K., et al., "12.3: Flexible, Active-Matrix Display Constructed Using a Microencapsulated Electrophoretic Material and an Organic-Semiconductor-Based Backplane", SID 01 Digest, 160 (Jun. 2001) Jun. 30, 2001.
Au, J. et al., "Ultra-Thin 3.1-in. Active-Matrix Electronic Ink Display for Mobile Devices", IDW'02, 223 (2002) Dec. 31, 2002.
Bouchard, A. et al., "High-Resolution Microencapsulated Electrophoretic Display on Silicon", SID 04 Digest, 651 (2004) Dec. 31, 2004.
Caillot, E. et al. "Active Matrix Electrophoretic Information Display for High Performance Mobile Devices", IDMC Proceedings (2003) Dec. 31, 2003.
Danner, G.M. et al., "Reliability Performance for Microencapsulated Electrophoretic Displays with Simulated Active Matrix Drive", SID 03 Digest, 573 (2003) Dec. 31, 2003.
Henzen, A. et al., "An Electronic Ink Low Latency Drawing Tablet", SID 04 Digest, 1070 (2004) Dec. 31, 2004.
Henzen, A. et al., "Development of Active Matrix Electronic Ink Displays for Handheld Devices", SID 03 Digest, 176, (2003) Dec. 31, 2003.
Henzen, A. et al., "Development of Active Matrix Electronic Ink Displays for Smart Handheld Applications", IDW'02, 227 (2002) Dec. 31, 2002.
Whitesides, T. et al., "Towards Video-rate Microencapsulated Dual-Particle Electrophoretic Displays", SID 04 Digest, 133 (2004) Dec. 31, 2004.
Amundson, K., "Electrophoretic Imaging Films for Electronic Paper Displays" in Crawford, G. ed. Flexible Flat Panel Displays, John Wiley & Sons, Ltd., Hoboken, NJ (2005) Dec. 31, 2005.
Gates, H. et al. "A5 Sized Electronic Paper Display for Document Viewing", SID 05 Digest (2005) Dec. 31, 2005.
Johnson, M. et al., "High Quality Images on Electronic Paper Displays", SID 05 Digest, 1666 (2005) Dec. 31, 2005.
Kazlas, P. et al., "Card-size Active-matrix Electronic Ink Display", Eurodisplay 2002, 259 (2002) Dec. 31, 2002.
Ulaby, Fawwaz T., Fundamentals of Applied Electromagnetics, Prentice Hall (2001), p. 157 Dec. 31, 2001.

ELECTRO-OPTIC ASSEMBLIES, AND ADHESIVES AND BINDERS FOR USE THEREIN

REFERENCE TO RELATED APPLICATIONS

This application is a division of copending application Ser. No. 12/264,696, filed Nov. 4, 2008 (Publication No. 2009/0122389), which itself claims benefit of Application Ser. No. 60/987,876, filed Nov. 14, 2007.

This application is also related to:
(a) U.S. Pat. No. 7,012,735;
(b) U.S. Pat. No. 7,173,752; and
(c) Application Ser. No. 61/052,427, filed May 12, 2008, and now abandoned.

The entire contents of these patents and copending applications, and of all other U.S. patents and published and copending applications mentioned below, are herein incorporated by reference.

BACKGROUND OF INVENTION

This invention relates to electro-optic assemblies useful in the production of electro-optic displays, and to adhesives and binders for use in such assemblies. More specifically, this invention provides adhesive and binder compositions having controlled volume resistivity, and electro-optic assemblies and displays incorporating such adhesives. The adhesives disclosed herein may be useful in applications other than electro-optic displays.

Electro-optic displays comprise a layer of electro-optic material, a term which is used herein in its conventional meaning in the art to refer to a material having first and second display states differing in at least one optical property, the material being changed from its first to its second display state by application of an electric field to the material. The optical property is typically color perceptible to the human eye, but may be another optical property, such as optical transmission, reflectance, luminescence or, in the case of displays intended for machine reading, pseudo-color in the sense of a change in reflectance of electromagnetic wavelengths outside the visible range.

Some electro-optic materials are solid in the sense that the materials have solid external surfaces, although the materials may, and often do, have internal liquid- or gas-filled spaces. Such displays using solid electro-optic materials may hereinafter for convenience be referred to as "solid electro-optic displays". Thus, the term "solid electro-optic displays" includes rotating bichromal member displays, encapsulated electrophoretic displays, microcell electrophoretic displays and encapsulated liquid crystal displays.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

Several types of electro-optic displays are known. One type of electro-optic display is a rotating bichromal member type as described, for example, in U.S. Pat. Nos. 5,808,783; 5,777,782; 5,760,761; 6,054,071 6,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed by applying an electric field thereto, thus rotating the bodies to various positions and varying which of the sections of the bodies is seen through a viewing surface. This type of electro-optic medium is typically bistable.

Another type of electro-optic display uses an electrochromic medium, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., Information Display, 18(3), 24 (March 2002). See also Bach, U., et al., Adv. Mater., 2002, 14(11), 845. Nanochromic films of this type are also described, for example, in U.S. Pat. Nos. 6,301,038; 6,870,657; and 6,950,220. This type of medium is also typically bistable.

Another type of electro-optic display is an electro-wetting display developed by Philips and described in Hayes, R. A., et al., "Video-Speed Electronic Paper Based on Electrowetting", Nature, 425, 383-385 (2003). It is shown in copending application Ser. No. 10/711,802, filed Oct. 6, 2004 (Publication No. 2005/0151709), that such electro-wetting displays can be made bistable.

One type of electro-optic display, which has been the subject of intense research and development for a number of years, is the particle-based electrophoretic display, in which a plurality of charged particles move through a fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a fluid. In most prior art electrophoretic media, this fluid is a liquid, but electrophoretic media can be produced using gaseous fluids; see, for example, Kitamura, T., et al., "Electrical toner movement for electronic paper-like display", IDW Japan, 2001, Paper HCS1-1, and Yamaguchi, Y, et al., "Toner display using insulative particles charged triboelectrically", IDW Japan, 2001, Paper AMD4-4). See also U.S. Patent Publication Nos. 2005/0259068, 2006/0087479, 2006/0087489, 2006/0087718, 2006/0209008, 2006/0214906, 2006/0231401, 2006/0238488, 2006/0263927 and U.S. Pat. Nos. 7,321,459 and 7,236,291. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT) and E Ink Corporation describe various technologies used in encapsulated electrophoretic and other electro-optic media. Such encapsulated media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. The technologies described in the these patents and applications include:

(a) Electrophoretic particles, fluids and fluid additives; see for example U.S. Pat. No. 7,002,728 and U.S. Patent Application Publication No. 2007/0146310;

(b) Capsules, binders and encapsulation processes; see for example U.S. Pat. Nos. 5,930,026; 6,067,185; 6,130,774; 6,172,798; 6,249,271; 6,327,072; 6,392,785; 6,392,786; 6,459,418; 6,839,158; 6,866,760; 6,922,276; 6,958,848; 6,987,603; 7,061,663; 7,071,913; 7,079,305; 7,109,968; 7,110,164; 7,202,991; 7,242,513; 7,304,634; 7,339,715; and 7,391,555; and U.S. Patent Applications Publication Nos. 2004/0112750; 2004/0155857; 2005/0156340; 2006/0007527; 2007/0057908; 2007/0091417; 2007/0223079; 2008/0023332; and 2008/0130092;

(c) Films and sub-assemblies containing electro-optic materials; see for example U.S. Pat. No. 6,982,178 and U.S. Patent Application Publication No. 2007/0109219;

(d) Backplanes, adhesive layers and other auxiliary layers and methods used in displays; see for example U.S. Pat. Nos. D485,294; 6,124,851; 6,130,773; 6,177,921; 6,232,950; 6,252,564; 6,312,304; 6,312,971; 6,376,828; 6,392,786; 6,413,790; 6,422,687; 6,445,374; 6,480,182; 6,498,114; 6,506,438; 6,518,949; 6,521,489; 6,535,197; 6,545,291; 6,639,578; 6,657,772; 6,664,944; 6,680,725; 6,683,333; 6,724,519; 6,750,473; 6,816,147; 6,819,471; 6,825,068; 6,831,769; 6,842,167; 6,842,279; 6,842,657; 6,865,010; 6,967,640; 6,980,196; 7,012,735; 7,030,412; 7,075,703; 7,106,296; 7,110,163; 7,116,318; 7,148,128; 7,167,155; 7,173,752; 7,176,880; 7,190,008; 7,206,119; 7,223,672; 7,230,751; 7,256,766; 7,259,744; 7,280,094; 7,327,511; 7,349,148; 7,352,353; 7,365,394; 7,365,733; 7,382,363; and 7,388,572; and U.S. Patent Applications Publication Nos. 2002/0060321; 2004/0105036; 2004/0180476; 2005/0122306; 2005/0122563; 2006/0176267; 2006/0223282; 2006/0291034; 2007/0035532; 2007/0035808; 2007/0052757; 2007/0069247; 2007/0085818; 2007/0097489; 2007/0109219; 2007/0152956; 2007/0211002; 2007/0211331; 2007/0247697; 2007/0286975; 2008/0030832; 2008/0057252; and 2008/0074730; International Application Publication No. WO 00/38000; and European Patents Nos. 1,099,207 B1 and 1,145,072 B1;

(e) Color formation and color adjustment; see for example U.S. Pat. No. 7,075,502 and U.S. Patent Application Publication No. 2007/0109219;

(f) Methods for driving displays; see for example U.S. Pat. No. 7,012,600 and U.S. Patent Application Publication No. 2006/0262060;

(g) Applications of displays; see for example U.S. Pat. No. 7,312,784 and U.S. Patent Application Publication No. 2006/0279527; and (h) Non-electrophoretic displays, as described in U.S. Pat. Nos. 6,241,921; and 6,950,220; and U.S. Patent Application Publication No. 2005/0151709.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned U.S. Pat. No. 6,866,760. Accordingly, for purposes of the present application, such polymer-dispersed electrophoretic media are regarded as sub-species of encapsulated electrophoretic media.

A related type of electrophoretic display is a so-called "microcell electrophoretic display". In a microcell electrophoretic display, the charged particles and the fluid are not encapsulated within microcapsules but instead are retained within a plurality of cavities formed within a carrier medium, typically a polymeric film. See, for example, U.S. Pat. Nos. 6,672,921 and 6,788,449, both assigned to Sipix Imaging, Inc.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, the aforementioned U.S. Pat. Nos. 6,130,774 and 6,172,798, and U.S. Pat. Nos. 5,872,552; 6,144,361; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (See U.S. Pat. No. 7,339,715); and other similar techniques.) Thus, the resulting display can be flexible. Further, because the display medium can be printed (using a variety of methods), the display itself can be made inexpensively.

Other types of electro-optic media, for example, polymer-dispersed liquid crystal, may also be used in the displays of the present invention.

An electro-optic display normally comprises a layer of electro-optic material and at least two other layers disposed on opposed sides of the electro-optic material, one of these two layers being an electrode layer. In most such displays both the layers are electrode layers, and one or both of the electrode layers are patterned to define the pixels of the display. For example, one electrode layer may be patterned into elongate row electrodes and the other into elongate column electrodes running at right angles to the row electrodes, the pixels being defined by the intersections of the row and column electrodes. Alternatively, and more commonly, one electrode layer has the form of a single continuous electrode and the other electrode layer is patterned into a matrix of pixel electrodes, each of which defines one pixel of the display. In another type of electro-optic display, which is intended for use with a stylus, print head or similar movable electrode separate from the display, only one of the layers adjacent the electro-optic layer comprises an electrode, the layer on the opposed side of the electro-optic layer typically being a protective layer intended to prevent the movable electrode damaging the electro-optic layer.

The manufacture of a three-layer electro-optic display normally involves at least one lamination operation. For example, in several of the aforementioned MIT and E Ink patents and applications, there is described a process for manufacturing an encapsulated electrophoretic display in which an encapsulated electrophoretic medium comprising capsules in a binder is coated on to a flexible substrate comprising indium-tin-oxide (ITO) or a similar conductive coating (which acts as one electrode of the final display) on a plastic film, the capsules/binder coating being dried to form a coherent layer of the electrophoretic medium firmly adhered to the substrate. Separately, a backplane, containing an array of pixel electrodes and an appropriate arrangement of conductors to connect the pixel electrodes to drive circuitry, is prepared. To form the final display, the substrate having the capsule/binder layer thereon is laminated to the backplane using a lamination adhesive. (A very similar process can be used to prepare an electrophoretic display usable with a stylus or similar movable electrode by replacing the backplane with a simple protective layer, such as a plastic film, over which the stylus or other movable electrode can slide.) In one preferred form of such a process, the backplane is itself flexible and is prepared by printing the pixel electrodes and conductors on a plastic film or other flexible substrate. The obvious lamination technique for mass production of displays by this process is roll lamination using a lamination adhesive. Similar manufacturing techniques can be used with other types of electro-optic displays. For example, a microcell electrophoretic medium or a rotating bichromal member medium may be laminated to a backplane in substantially the same manner as an encapsulated electrophoretic medium.

As discussed in the aforementioned U.S. Pat. No. 6,982,178, (see column 3, lines 63 to column 5, line 46) many of the components used in solid electro-optic displays, and the methods used to manufacture such displays, are derived from technology used in liquid crystal displays (LCD's), which are of course also electro-optic displays, though using a liquid rather than a solid medium. For example, solid electro-optic displays may make use of an active matrix backplane comprising an array of transistors or diodes and a corresponding array of pixel electrodes, and a "continuous" front electrode (in the sense of an electrode which extends over multiple pixels and typically the whole display) on a transparent substrate, these components being essentially the same as in LCD's. However, the methods used for assembling LCD's cannot be used with solid electro-optic displays. LCD's are normally assembled by forming the backplane and front electrode on separate glass substrates, then adhesively securing these components together leaving a small aperture between them, placing the resultant assembly under vacuum, and immersing the assembly in a bath of the liquid crystal, so that the liquid crystal flows through the aperture between the backplane and the front electrode. Finally, with the liquid crystal in place, the aperture is sealed to provide the final display.

This LCD assembly process cannot readily be transferred to solid electro-optic displays. Because the electro-optic material is solid, it must be present between the backplane and the front electrode before these two integers are secured to each other. Furthermore, in contrast to a liquid crystal material, which is simply placed between the front electrode and the backplane without being attached to either, a solid electro-optic medium normally needs to be secured to both; in most cases the solid electro-optic medium is formed on the front electrode, since this is generally easier than forming the medium on the circuitry-containing backplane, and the front electrode/electro-optic medium combination is then laminated to the backplane, typically by covering the entire surface of the electro-optic medium with an adhesive and laminating under heat, pressure and possibly vacuum. Accordingly, most prior art methods for final lamination of solid electrophoretic displays are essentially batch methods in which (typically) the electro-optic medium, a lamination adhesive and a backplane are brought together immediately prior to final assembly, and it is desirable to provide methods better adapted for mass production.

Electro-optic displays are often costly; for example, the cost of the color LCD found in a portable computer is typically a substantial fraction of the entire cost of the computer. As the use of electro-optic displays spreads to devices, such as cellular telephones and personal digital assistants (PDA's), much less costly than portable computers, there is great pressure to reduce the costs of such displays. The ability to form layers of some solid electro-optic media by printing techniques on flexible substrates, as discussed above, opens up the possibility of reducing the cost of electro-optic components of displays by using mass production techniques such as roll-to-roll coating using commercial equipment used for the production of coated papers, polymeric films and similar media.

U.S. Pat. No. 6,982,178 describes a method of assembling a solid electro-optic display (including an encapsulated electrophoretic display) which is well adapted for mass production. Essentially, this patent describes a so-called "front plane laminate" ("FPL") which comprises, in order, a light-transmissive electrically-conductive layer; a layer of a solid electro-optic medium in electrical contact with the electrically-conductive layer; an adhesive layer; and a release sheet. Typically, the light-transmissive electrically-conductive layer will be carried on a light-transmissive substrate, which is preferably flexible, in the sense that the substrate can be manually wrapped around a drum (say) 10 inches (254 mm) in diameter without permanent deformation. The term "light-transmissive" is used in this patent and herein to mean that the layer thus designated transmits sufficient light to enable an observer, looking through that layer, to observe the change in display states of the electro-optic medium, which will normally be viewed through the electrically-conductive layer and adjacent substrate (if present); in cases where the electro-optic medium displays a change in reflectivity at non-visible wavelengths, the term "light-transmissive" should of course be interpreted to refer to transmission of the relevant non-visible wavelengths. The substrate will typically be a polymeric film, and will normally have a thickness in the range of about 1 to about 25 mil (25 to 634 µm), preferably about 2 to about 10 mil (51 to 254 µm). The electrically-conductive layer is conveniently a thin metal or metal oxide layer of, for example, aluminum or ITO, or may be a conductive polymer. Poly (ethylene terephthalate) (PET) films coated with aluminum or ITO are available commercially, for example as "aluminized Mylar" ("Mylar" is a Registered Trade Mark) from E.I. du Pont de Nemours & Company, Wilmington Del., and such commercial materials may be used with good results in the front plane laminate.

The aforementioned U.S. Pat. No. 6,982,178 also describes a method for testing the electro-optic medium in a front plane laminate prior to incorporation of the front plane laminate into a display. In this testing method, the release sheet is provided with an electrically conductive layer, and a voltage sufficient to change the optical state of the electro-optic medium is applied between this electrically-conductive layer and the electrically conductive layer on the opposed side of the electro-optic medium. Observation of the electro-optic medium will then reveal any faults in the medium, thus avoiding laminating faulty electro-optic medium into a display, with the resultant cost of scrapping the entire display, not merely the faulty front plane laminate.

The aforementioned U.S. Pat. No. 6,982,178 also describes a second method for testing the electro-optic medium in a front plane laminate by placing an electrostatic charge on the release sheet, thus forming an image on the electro-optic medium. This image is then observed in the same way as before to detect any faults in the electro-optic medium.

Assembly of an electro-optic display using such a front plane laminate may be effected by removing the release sheet from the front plane laminate and contacting the adhesive layer with the backplane under conditions effective to cause the adhesive layer to adhere to the backplane, thereby securing the adhesive layer, layer of electro-optic medium and electrically-conductive layer to the backplane. This process is well-adapted to mass production since the front plane laminate may be mass produced, typically using roll-to-roll coating techniques, and then cut into pieces of any size needed for use with specific backplanes.

The aforementioned 2004/0155857 describes a so-called "double release sheet" which is essentially a simplified version of the front plane laminate of the aforementioned U.S. Pat. No. 6,982,178. One form of the double release sheet comprises a layer of a solid electro-optic medium sandwiched between two adhesive layers, one or both of the adhesive layers being covered by a release sheet. Another form of the double release sheet comprises a layer of a solid electro-optic medium sandwiched between two release sheets. Both forms of the double release film are intended for use in a process generally similar to the process for assembling an electro-optic display from a front plane laminate already described, but involving two separate laminations; typically, in a first lamination the double release sheet is laminated to a front electrode to form a front sub-assembly, and then in a second lamination the front sub-assembly is laminated to a backplane to form the final display, although the order of these two laminations could be reversed if desired.

The aforementioned 2007/0109219 describes a so-called "inverted front plane laminate", which is a variant of the front plane laminate described in the aforementioned U.S. Pat. No. 6,982,178. This inverted front plane laminate comprises, in order, at least one of a light-transmissive protective layer and a light-transmissive electrically-conductive layer; an adhesive layer; a layer of a solid electro-optic medium; and a release sheet. This inverted front plane laminate is used to form an electro-optic display having a layer of lamination adhesive between the electro-optic layer and the front electrode or front substrate; a second, typically thin layer of adhesive may or may not be present between the electro-optic layer and a backplane. Such electro-optic displays can combine good resolution with good low temperature performance. As discussed in the aforementioned U.S. Pat. Nos. 7,012,735 and 7,173,752, the selection of a lamination adhesive for use in an electro-optic display (or in a front plane laminate, inverted front plane laminate, double release film or other sub-assembly used to produce such an electro-optic display) presents certain peculiar problems. Since the lamination adhesive is normally located between the electrodes, which apply the electric field needed to change the electrical state of the electro-optic medium, the electrical properties of the adhesive are usually crucial. The lamination adhesive also needs to fulfill several mechanical and rheological criteria, including strength of adhesive, flexibility, ability to withstand and flow at lamination temperatures, etc. The number of commercially available adhesives which can fulfill all the relevant electrical and mechanical criteria is small, and in practice the most suitable lamination adhesives are certain polyurethanes, such as those described in U.S. Patent Application Publication No. 2005/0107564. These polyurethanes are based on the polymerization of tetramethylxylene diisocyanate (TMXDI-systematic name 1,3-bis(1-isocyanato-1-methylethyl)benzene)) with polypropylene glycol and 2,2-bis(hydroxymethyl)propionic acid, chain extended with hexamethylene diamine. After the polyurethane is prepared, it is dispersed as an aqueous latex-like suspension by neutralization with triethylamine and dilution with water. However, in practice it is not possible to vary the conductivity of the polyurethane by controlling the proportions of the materials used in its manufacture.

As a result, the polyurethane adhesive is not sufficiently conductive for use in many electro-optic displays and electro-optic assemblies, and it known to increase its conductivity by doping it with salts or other materials, as described in the aforementioned U.S. Pat. Nos. 7,012,735 and 7,173,752. A preferred dopant for this purpose is tetrabutylammonium hexafluorophosphate (hereinafter "TBAHFP"). Unfortunately, it has been found that adhesives formulated in this manner can damage active matrix backplanes comprising transistors made from certain organic semiconductors. The present invention provides alternative forms of lamination adhesive which can reduce or eliminate the problems caused by prior art adhesives when used in displays containing organic semiconductors. The present invention also extends to modification of the binder used in electro-optic displays to reduce or eliminate problems caused by prior art binders in displays containing organic semiconductors.

SUMMARY OF INVENTION

This invention has two main aspects. The first aspect relates to incorporation of an ionic material into an adhesive layer in a manner which does not permit the material to diffuse out of the adhesive layer. The second aspect relates to pre-treatment of adhesive material or binder to remove certain diffusible species which may damage organic semiconductors.

Accordingly, in one aspect this invention provides an electro-optic assembly comprising an adhesive layer and a layer of electro-optic material, the adhesive layer comprising a polymeric adhesive material and an ionic material, the ionic material having one of its cation and anion fixed to the polymeric adhesive material and the other of its cation and anion free to migrate through the polymeric adhesive material, the ionic material reducing the volume resistivity of the polymeric adhesive material and not being removed by heating the polymeric adhesive material to about 50° C.

Hereinafter for convenience the cation or anion of the ionic material which is fixed to the polymeric adhesive material will be called the "fixed ion" and the cation or anion free to migrate through the polymeric adhesive material will be called the "mobile ion". Typically, the fixed ion will be chemically bonded to the polymeric adhesive, and various techniques for providing such ions bonded to polyurethane adhesives are discussed below. However, such chemical bonding is not absolutely necessary, provided that the fixed ion cannot migrate through the polymeric adhesive; for example, the fixed ion could form part of a polymer different from the polymeric adhesive but chain entangled therewith.

In one form of the electro-optic assembly, the ionic material comprises a quaternary ammonium or phosphonium cation and a carboxylate anion fixed to the polymeric adhesive material. The polymeric adhesive material may comprise a polyurethane. Alternatively, the ionic material may comprise a quaternary ammonium or phosphonium cation fixed to the polymeric adhesive material and a hexafluorophosphate, tetrabutylborate or tetraphenylborate anion. In another form of the electro-optic assembly, the ionic material comprises repeating units derived from a basic monomer and a mobile anion selected from the group comprising sulfonates, sulfates, hexafluorophosphates, tetrafluoroborates, bis(methanesulfonyl)imidate, phosphates and phosphonates. The basic monomer may comprise, for example, any one or more of vinylpyridine, β-dimethylaminoethyl acrylate, N-methyl or benzyl(vinylpyridine), N-alkyl or alkaryl-N'-vinylimidazole, and β-(trimethylammonioethyl)acrylate or methacrylate.

In such an electro-optic assembly, the electro-optic material may comprise a rotating bichromal member or electrochromic material. Alternatively, the electro-optic material may comprise an electrophoretic material comprising a plurality of electrically charged particles disposed in a fluid and capable of moving through the fluid under the influence of an electric field. The electrically charged particles and the fluid may be confined within a plurality of capsules or microcells. Alternatively, the electrically charged particles and the fluid may be present as a plurality of discrete droplets surrounded by a continuous phase comprising a polymeric material. The fluid may be liquid or gaseous.

The present invention extends to an electro-optic display, front plane laminate, inverted front plane laminate or double release film comprising an electro-optic assembly of the present invention.

The present invention also provides an electro-optic assembly comprising an adhesive layer and a layer of electro-optic material, the adhesive layer comprising a polymeric adhesive material which has been subjected to dialysis or diafiltration to remove organic species having a molecular weight less than about 3,500.

The present invention also provides an electro-optic assembly comprising an adhesive layer and a layer of electro-optic material, the adhesive layer comprising a polymeric adhesive material having a content of N-methylpyrrolidone not exceeding about 500 ppm based upon the total weight of the adhesive layer and layer of electro-optic material.

In such an electro-optic assembly, the polymeric adhesive material may comprise a polyurethane. The content of N-methylpyrrolidone preferably does not exceed about 200 ppm and desirably 100 ppm, based upon the total weight of the adhesive layer and layer of electro-optic material.

In such an electro-optic assembly, the electro-optic material may comprise a rotating bichromal member or electrochromic material. Alternatively, the electro-optic material may comprise an electrophoretic material comprising a plurality of electrically charged particles disposed in a fluid and capable of moving through the fluid under the influence of an electric field. The electrically charged particles and the fluid may be confined within a plurality of capsules or microcells. Alternatively, the electrically charged particles and the fluid may be present as a plurality of discrete droplets surrounded by a continuous phase comprising a polymeric material. The fluid may be liquid or gaseous.

The present invention extends to an electro-optic display, front plane laminate, inverted front plane laminate or double release film comprising an electro-optic assembly of the present invention.

The present invention also provides an electrophoretic medium comprising a continuous phase and a discontinuous phase, the discontinuous phase comprising a plurality of droplets, each of which comprises a suspending fluid and at least one particle disposed within the suspending fluid and capable of moving through the fluid upon application of an electric field to the electrophoretic medium, the continuous phase surrounding and encapsulating the discontinuous phase and comprising a polymeric binder which has been subjected to dialysis or diafiltration to remove organic species having a molecular weight less than about 3,500. The electrophoretic medium may be either of the encapsulated or polymer-dispersed type, i.e., there may or may not be a capsule wall between each droplet and the binder.

The present invention also provides an electrophoretic medium comprising a continuous phase and a discontinuous phase, the discontinuous phase comprising a plurality of droplets, each of which comprises a suspending fluid and at least one particle disposed within the suspending fluid and capable of moving through the fluid upon application of an electric field to the electrophoretic medium, the continuous phase surrounding and encapsulating the discontinuous phase and comprising a polymeric binder having a content of N-methylpyrrolidone not exceeding about 1000 ppm based upon the weight of the electrophoretic medium.

The present invention extends to an electro-optic display, front plane laminate, inverted front plane laminate or double release film comprising an electro-optic assembly or electrophoretic medium of the present invention.

The displays of the present invention may be used in any application in which prior art electro-optic displays have been used. Thus, for example, the present displays may be used in electronic book readers, portable computers, tablet computers, cellular telephones, smart cards, signs, watches, shelf labels and flash drives.

DETAILED DESCRIPTION

A particularly preferred embodiment of the electro-optic assembly of the present invention will now be described, though by way of illustration only, with reference to FIG. 1 of the accompanying drawings, which is a schematic section through one such assembly having the form of a front plane laminate. This electro-optic assembly comprises a substrate, a conductive layer, an electro-optic layer, an adhesive layer, and a second substrate in the form of a release sheet; the assembly is illustrated at an intermediate stage of the manufacturing process for an electro-optic display before the subassembly is laminated to a second assembly, namely a backplane.

Figure 1:
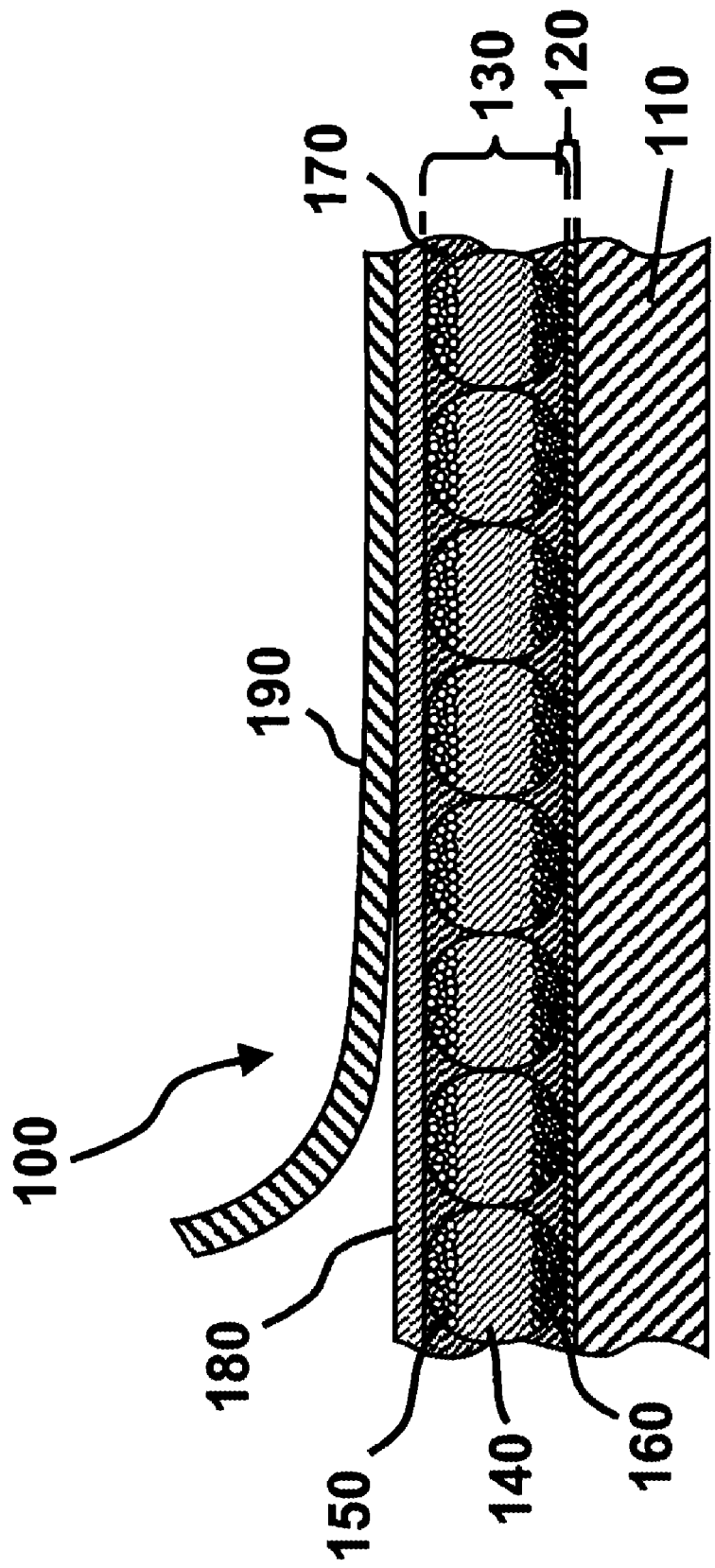
FIG. 1 is a schematic cross-section through an electro-optic assembly of the present invention having the form of a front plane laminate.

The front plane laminate (generally designated 100) shown in FIG. 1 comprises a light-transmissive substrate 110, a light-transmissive electrode layer 120, an electro-optic layer 130, a lamination adhesive layer 180 and a release sheet 190; the release sheet is illustrated in the process of being removed from the lamination adhesive layer 180 preparatory to lamination of the FPL 100 to a backplane.

The substrate 110 is typically a transparent plastic film, such as a 7 mil (177 μm) polyethylene terephthalate sheet. The lower surface (in FIG. 1) of substrate 110, which forms the viewing surface of the final display, may have one or more additional layers (not shown), for example a protective layer to absorb ultra-violet radiation, barrier layers to prevent ingress of oxygen or moisture into the final display, and anti-reflection coatings to improve the optical properties of the display. Coated onto the upper surface of substrate 110 is the thin light-transmissive electrically conductive layer 120, preferably of ITO, which acts as the common front electrode in the final display. PET films coated with ITO are available commercially.

The electro-optic layer 130 may be deposited on the conductive layer 120, typically by slot coating, the two layers being in electrical contact. The electro-optic layer 130 shown in FIG. 1 is an encapsulated electrophoretic medium and comprises microcapsules 140, each of which comprises negatively charged white particles 150 and positively charged black particles 160 suspended in a hydrocarbon-based suspending fluid 165. The microcapsules 140 are held retained within a polymeric binder 170. Upon application of an electrical field across electro-optic layer 130, white particles 150 move to the positive electrode and black particles 160 move to the negative electrode, so that electro-optic layer 130 appears, to an observer viewing the display through substrate 110, white or black depending on whether conductive layer 120 is positive or negative relative to the adjacent pixel electrode in the backplane.

The FPL 100 is desirably prepared by coating the lamination adhesive 180, in liquid form, conveniently by slot coating, on to release sheet 190, drying (or otherwise curing) the adhesive to form a solid layer, and then laminating the adhesive and release sheet to the electro-optic layer 130, which has previously been coated on to the substrate 110 bearing the conductive layer 120; this lamination may conveniently be effected using hot roll lamination. (Alternatively, but less desirably, the lamination adhesive may be applied over the electro-optic layer 130 and then dried or otherwise cured before being covered with the release sheet 190.) The release sheet 190 is conveniently a 7 mil (177 μm) film; depending upon the nature of the electro-optic medium used, it may be desirable to coat this film with a release agent, for example a silicone. As illustrated in FIG. 1, the release sheet 190 is peeled or otherwise removed from the lamination adhesive 180 before the FPL 100 is laminated to a backplane (not shown) to form the final display.

As indicated above, the present invention has two principal aspects, the first relating to incorporation of non-diffusible ionic material into an adhesive layer and the second relating to the use of dialyzed or diafiltered adhesive material and/or binder in electrophoretic media and displays. The two principal aspects of the invention will mainly be discussed separately below, but it will readily be apparent that both aspects of the invention may be incorporated into a single physical display.

Part A: Non-Diffusible Ionic Material

As indicated above, in one aspect the present invention provides an electro-optic assembly comprising an electro-optic layer and an adhesive layer. The adhesive layer contains an ionic material, of which one ion cannot migrate through the adhesive layer while the other can. This type of ionic material prevents ions diffusing out of the adhesive layer and potentially damaging other layers (for example, organic semiconductor layers) into which the ions diffuse.

Ionic conduction in polymeric adhesive layers has been shown to occur by a "hopping" mechanism, in which dissociated free ions translate among ionic aggregates (ion pairs and higher aggregates), most of these aggregates being essentially neutral. In accordance with the present invention, only one of the anion and cation of the ionic material is capable of motion. The fixed ion is constrained to a single location, while the mobile ion is still free to migrate. An example of an appropriate ionic material a polymeric salt, for example, an ionic salt of a polymeric carboxylate. In this case the carboxylate ion is effectively immobile because it is attached to the polymer chain, and can only move with the polymer as a whole. The cationic counterion, on the other hand, can freely participate in hopping motions, and the rate at which it can move depends on the strength of the electrostatic interaction with the anionic carboxylate, the concentration of carboxylate-counterion aggregates in the adhesive medium, the viscosity of the medium, and the free energy of solvation of the counterion by the medium.

As in the ion doped adhesives described in the aforementioned U.S. Pat. No. 7,012,735, in the present invention large cations are advantageous, in that they have relatively low electrostatic energies of attraction to the ionic aggregate states, and therefore dissociate readily from them. As an example, a quaternary ammonium hydroxide could be used to neutralize the carboxylic functions on the polyurethane, leading to a quaternary ammonium carboxylate polymer capable of supporting ionic conduction as described above.

It is desirable that the ionic material be chosen such that the conductivity of the final adhesive layer after drying can be modified and adjusted by varying the carboxylic acid content of the polyurethane, and also by the cation used. For example, in the aforementioned system where a carboxylic group on the polyurethane is neutralized with a quaternary ammonium hydroxide, at a given carboxylic acid content, the conductivity would be expected to increase in the order:

tetramethylammonium<tetraethylammonium<tetrabutylammonium, etc.

Phosphonium salts could also be used, and should be somewhat more conductive than the nitrogen containing analogs because of the larger size of the central atom. Other cationic species (e.g., complex ions of metals) may also be useful for this purpose. Solubility of the ionic material in the adhesive is not an issue in this approach, since the ions are an intrinsic part of the medium and cannot therefore phase separate as a separate crystalline phase.

The acidic component of the polymeric adhesive may also be made more acidic by replacing a carboxylic acid component by a group with a higher dissociation constant, for example, a sulfate monoester, sulfonic acid, sulfinic acid, a phosphonic acid, phosphinic acid group or phosphate ester, as long as there is at least one dissociable proton present. Quaternary salts and other large cations would still be expected to be most useful as counter ions because of their large size, and relatively high degree of ionic dissociation in dried adhesive media of low polarity. Nitrogen-based acids could also be used if attached to sufficiently electron-withdrawing functions (e.g., $RSO_2$—NH—$SO_2R$)). In this case almost any mobile ion could be used, including tertiary ammonium, because the mobile ion will exist in the protonated form even in the dried adhesive. However, mobile ions based on larger amines (i.e., ones with longer alkyl tails) might still be preferable, because they are effectively larger in size and therefore the ion pairs comprising them would be more dissociable.

Alternatively, a carboxylate group on the adhesive could be used with a mobile ion that is not a strong Bronsted acid, i.e., which does not have an acidic proton, such as the quaternary cations discussed above.

Adhesive compositions in which a cation is the fixed ion can be constructed by using quaternary ammonium groups in the polymer backbone or as side chains, and preferably using large anions (e.g., hexafluorophosphate, tetrabutylborate, tetraphenylborate, etc.) as the mobile ions. The quaternary ammonium groups could be replaced by phosphonium, sulfonium or other cationic groups without dissociable hydrogen, including those formed by complexation with metallic cations. Examples of the latter include polyether/lithium ion inclusion complexes, especially cyclic polyethers (e.g. 18-crown-6) or polyamine complexes with transition metal ions. In this case the anionic mobile ion could include those types of ions listed above, plus more strongly basic materials such as carboxylates or even phenolates.

Alternative fixed cation adhesive materials include polymers containing repeating units derived from basic monomers, for example poly(vinylpyridine), poly(β-dimethylaminoethyl acrylate), etc. and copolymers containing such groups, in conjunction with mobile anions that are not good Bronsted acceptors (e.g., sulfonates, sulfates, hexafluorophosphate, tetrafluoroborate, bis(methanesulfonyl)imidate, phosphates, phosphonates, etc.). Quaternary salts derived from such amino monomers may also be used, for example poly(N-methyl or benzyl(vinylpyridinium)), poly(N-alkyl (or alkaryl)-N'-vinylimidazolium), and poly(β-trimethylammonioethyl)acrylate or methacrylate) salts, as well as vinyl copolymers comprising these ionic groups. As before, larger mobile ions are preferred.

These chemical modification techniques are not restricted to polyurethanes but can be applied to any polymer of suitable structure. For example, vinyl-based polymers can contain either anions or cation fixed ions.

Part B: Dialyzed or Diafiltered Adhesive Material and/or Binder

As already noted, one aspect of the present invention reduces or eliminates problems caused by migration of ionic dopants from adhesive layers into other layers of electro-optic displays, especially damage to active matrix backplanes comprising transistors made from certain organic semiconductors. However, it has now been found that the causes of these problems are not confined to ionic dopants but include other fugitive species present in prior art adhesive and binder compositions, which can migrate from the adhesive or binder layer to other layers of the electro-optic display in a manner similar to the ionic dopants. One such fugitive species of particular concern is N-methylpyrrolidone (NMP), which is used as a solvent in the preparation of polyurethanes. Other fugitive species which may be of concern in some cases include other solvents used in the preparation of polyurethanes, and dialyzable poorly characterized low molecular weight molecules from the polymerization reaction. It has been found that removing NMP by careful drying of the adhesive layer improves that layer's storage stability. Dialysis of the lamination adhesive removes both NMP and also other low molecular weight materials and is even more effective. The non-diffusible ionic material adhesive compositions of the present invention can be subjected to dialysis, since electrical neutrality prevents gross separation of the fixed and mobile ions, and after dialysis the adhesive material contains little or no diffusible materials. The present adhesives have therefore been found to be particularly effective in reducing the deleterious effects of the lamination adhesive on the performance of backplanes containing organic semiconductors. Diafiltration can also be used instead of dialysis.

As already noted, the non-diffusible ionic material adhesive materials of the present invention can be purified by dialysis or diafiltration. However, it may also be useful to synthesize these adhesive materials by dialysis. For example an aqueous solution of a polyamine or polyether could be partially transformed into a cationic complex by dialysis of the polymer solution in a solution of the appropriate water-soluble metal salt.

Dialysis or diafiltration can also be used to remove NMP and other fugitive species from conventional polyurethane adhesives before such adhesives are mixed with conventional ionic dopants. Thus, as already noted, in its second principal aspect this invention provides an electro-optic assembly comprising an adhesive layer and a layer of electro-optic material, the adhesive layer comprising a polymeric adhesive material which has been subjected to dialysis or diafiltration to remove organic species having a molecular weight less than about 3,500. Such dialysis or diafiltration may be used be remove, among other species, NMP, tetrahydrofuran (THF) and acetone. Similarly, the second aspect of the present invention also provides an electro-optic assembly comprising an adhesive layer and a layer of electro-optic material, the adhesive layer comprising a polymeric adhesive material having a content of N-methylpyrrolidone not exceeding about 500 ppm, preferably not exceeding about 200 ppm, and desirably not exceeding about 100 ppm, in all cases based upon the total weight of the adhesive layer and layer of electro-optic material.

The second aspect of the present invention also provides an electrophoretic medium comprising a continuous phase and a discontinuous phase, the discontinuous phase comprising a plurality of droplets, each of which comprises a suspending fluid and at least one particle disposed within the suspending fluid and capable of moving through the fluid upon application of an electric field to the electrophoretic medium, the continuous phase surrounding and encapsulating the discontinuous phase and comprising a polymeric binder which has been subjected to dialysis or diafiltration to remove organic species having a molecular weight less than about 3,500. The electrophoretic medium may be either of the encapsulated or polymer-dispersed type, i.e., there may or may not be a capsule wall between each droplet and the binder. The second aspect of the present invention also provides an electrophoretic medium comprising a continuous phase and a discontinuous phase, the discontinuous phase comprising a plurality of droplets, each of which comprises a suspending fluid and at least one particle disposed within the suspending fluid and capable of moving through the fluid upon application of an electric field to the electrophoretic medium, the continuous phase surrounding and encapsulating the discontinuous phase and comprising a polymeric binder having a total content of N-methylpyrrolidone, tetrahydrofuran and acetone not exceeding about 1000 ppm, preferably not exceeding about 400 ppm and desirably not exceeding about 200 ppm, in all cases based upon the weight of the electrophoretic medium (i.e., of the combination of the continuous and discontinuous phases).

As already indicated, the second aspect of the present invention may be used to remove NMP and possibly other fugitive species from the lamination adhesive and/or the binder used in an electro-optic display. In many cases, removal of fugitive species from the binder is of greater importance than removal from the lamination adhesive. The preparation of a lamination adhesive layer typically involves coating a flowable form of the adhesive on to a release sheet, then drying the layer of adhesive so that a coherent layer of adhesive is formed on the release sheet. High temperature and low coating speeds during the drying step suffice to drive off a large proportion of volatile organic species; for example, it has been found that a lamination adhesive coated at 50,000 ppm of NMP had only 200 ppm of NMP after drying. Furthermore, since only layers present during drying are the lamination adhesive and the release sheet (lamination of the adhesive to the electro-optic medium takes place only after the drying step), the choice of drying conditions can be based only upon the properties of the lamination adhesive itself, and does not need to take into account the properties of the electro-optic medium. In contrast, the binder used in an electrophoretic medium is typically admixed with the discontinuous phase of the medium to form a slurry which is then coated and dried to form the electrophoretic medium. Hence, in this case the drying conditions must take account of the properties of the discontinuous phase, and in particular concerns about simultaneous removal of the volatile discontinuous phase solvent. Finally, from a quality control point of view, removing all materials having the potential to damage any backplane with which an electro-optic medium may be expected to come into contact represents a good insurance policy, so that the number of unknown constituents (whose concentration could change with no knowledge or control) is kept to a minimum; obviously, as a matter of good manufacturing process, use of pure materials of known composition is highly desirable.

Both dialysis and diafiltration are well known ways of purifying suspensions of colloids and polymers. In both techniques, the suspension is confined by a semi-permeable membrane on the opposed side of which is a washing solution, typically water or a buffer solution. Molecules that can pass through the membrane and are soluble in the washing solution equilibrate between the two regions of the apparatus, and are removed from the suspension by exchange of the washing solution. Typically, the membrane is made of a material that allows selective passage of low molecular weight materials, and water is commonly employed as the solvent; in the present invention a membrane with a molecular-weight cutoff (MWCO) of about 3.5 kD has been found useful. Since NMP is a water-soluble solvent, these techniques are well suited for the removal of this contaminant. At the same time, other soluble materials, some with potentially deleterious properties, can also be removed. There is no requirement that the species to be removed be appreciably volatile, as is the case for removal by drying. By adjusting the properties of the membrane, the class of molecules removed can be changed. For example, if in a particular lamination adhesive or binder the presence of water-soluble oligomeric polymer fragments were a problem, a membrane with a higher MWCO could be used to remove such fragments; a variety of semi-permeable membranes with various MWCO's are available commercially.

Either dialysis or diafiltration can be used in the present process, but for commercial production diafiltration is usually preferred. Dialysis is a simple equilibration process, while diafiltration employs high flow conditions and high trans-membrane pressures to accelerate mass transport though the membrane. Diafiltration is substantially faster than dialysis, and can be employed under conditions that prevent dilution of the material being purified, as is often the case in dialysis. Diafiltration is a readily scalable process, and both laboratory scale and production scale equipment is available at reasonable cost. Diafiltration is a well established industrial procedure, widely used in the biochemical and other industries.

The present inventors have shown that both dialysis and diafiltration are effective in the removal of NMP from suspensions of commercial polyurethane latices. It has been found empirically that dialysis and diafiltration of polyurethane latices using a membrane with a low MWCO (3.5 kD) can reduce the NMP content by more than an order of magnitude in a few hours. For example, the NMP content of one polyurethane binder was reduced from about 14% (140,000 ppm) to about 500 ppm by diafiltration. When using dialysis, the efficiency of NMP removal may be limited by dilution of the latex, which made the latex difficult to coat, especially in the case of a lamination adhesive. The latex could be concentrated by evaporation of the excess water under reduced pressure, but this was an awkward procedure. Examination of the molecular weight distribution of the purified polyurethane latex showed that it was essentially identical to the starting material, i.e., no polymer was lost during dialysis. When dialysed material was used in the place of undialysed binder and lamination adhesive, a number of advantages were observed.

First, the degradation in the performance of organic semiconductor backplanes was largely eliminated. The same result could be obtained if only the binder, and not the lamination adhesive, was dialysed. If the binder dialysis was omitted, however, severe degradation in organic semiconductor device performance was experienced.

A second advantage was that the cell-gap resistance (a measure of the electrical conductivity of the front plane laminate) was higher, typically by about 50 percent, using dialysed materials. A higher cell-gap resistance puts fewer demands on the on-state conductivity of the operating transistor (that is, a lower on-off ratio is permissible). This is a particularly important characteristic for organic semiconductor transistors, the on-off ratio of which is typically not as high as for inorganic transistors.

A third advantage was a small improvement in the electro-optical properties of the electrophoretic medium produced from the dialyzed latex. As illustrated in Example 5 below, use of dialysed polyurethane latex resulted in about a 2L* (using the usual CIE definition of L*) improvement in dynamic range (the difference between the extreme white and dark electro-optic states of the medium) relative to use of undialysed material.

The following Examples are now given, though by way of illustration only, to show details of preferred reagents, conditions and techniques used in the present invention.

EXAMPLE 1: SYNTHESIS OF TMXDI-PPO POLYURETHANE WITH TETRABUTYLAMMONIUM HYDROXIDE NEUTRALIZATION

The polyurethane prepared in this Example is similar to the prior art polyurethane produced in Example 2 below, except that it has a higher acid content.

A prepolymer was prepared in a three-necked round bottom flask equipped with a magnetic stirrer, a condenser, and a nitrogen inlet. The reaction was carried out under nitrogen. Tetramethylxylene diisocyanate (TMXDI, supplied by Aldrich Chemical Company, 16.34 g, 0.067 mole), poly(propylene glycol) diol (supplied by Aldrich Chemical Company, average $M_n$ ca. 2000, 33.5 g, 0.0168 mole), and dibutyltin dilaurate (supplied by Aldrich Chemical Company, 0.04 g) were charged into the flask and the mixture was heated at 90° C. in an oil bath for 2 hours. Afterwards, a solution of 2,2-bis(hydroxymethyl)propionic acid (from Aldrich, 3.35 g, 0.025 mol) in 1-methyl-2-pyrrolidinone (from Aldrich, 8.5 g) was added to the flask and the reaction allowed to proceed at 90° C. for another 2 hours to obtain NCO-terminated prepolymer. The temperature of the reaction mixture was then lowered to 70° C. Separately, tetrabutylammonium hydroxide (NBu$_4$OH) (from Aldrich, 6.15 g, 0.0237 mol) and de-ionized water (100 g) were charged into a jacketed 500 mL glass reactor equipped with a mechanical stirrer, a thermometer, and a nitrogen inlet, and the resultant mixture was heated to 35° C. under nitrogen. The prepolymer mixture was then slowly added to the aqueous NBu$_4$OH solution to convert the prepolymer to a water-borne dispersion under mechanical stirring and nitrogen atmosphere. A chain extension reaction was carried out after the dispersing step with hexamethylenediamine (from Aldrich) dissolved in a small amount of water at 35° C. The end point of the chain extension reaction was determined from pH measurement. Finally, the resultant dispersion was heated to 50° C. for one hour to make sure that any residual isocyanate groups were consumed by water.

EXAMPLE 2: SYNTHESIS OF TMXDI-PPO POLYURETHANE WITH TRIETHYLAMINE NEUTRALIZATION (CONTROL)

Example 1 was repeated up to the point at which an NCO-terminated prepolymer was obtained and the temperature of the reaction mixture lowered to 70° C. Thereafter triethylamine (from Aldrich, 2.4 g, 0.0237 mole) was added slowly over a period of 30 minutes to neutralize the carboxylic acid. The reaction mixture was then slowly added to de-ionized water (100 g) at 35° C. in a jacketed 500 mL glass reactor under mechanical stirring and nitrogen atmosphere to convert the prepolymer to a water-borne dispersion. The chain extension reaction and the final heating of the dispersion to 50° C. were carried out in the same manner as in Example 1.

EXAMPLE 3: PREPARATION OF EXPERIMENTAL SINGLE PIXEL DISPLAYS FROM THE MATERIALS PREPARED IN EXAMPLES 1 AND 2

The polyurethanes prepared in Examples 1 and 2 above were separately coated on to metallized release film in a (dried) thickness of about 20 μm. Drying of the coated polymeric films was carried out in a belt-transport drying oven at 60° C. and a transport rate of 1 ft/min (about 5.1 mm/sec); these conditions are known to reduce the content of NMP to a very low level. Separately, an electrophoretic medium was prepared substantially as described in Example 4 of U.S. Pat. No. 7,002,728 and coated on to the indium tin oxide (ITO) coated surface of a 5 mil (127 μm) poly(ethylene terephthalate) (PET) film coated on one surface with ITO. The two sub-assemblies were laminated to each other with the electrophoretic layer in contact with the lamination adhesive to form a front plane laminate as described in the aforementioned U.S. Pat. No. 6,982,178. The release sheet was peeled from the front plane laminate and the remaining layers laminated to experimental single pixel 2 inch (51 mm) square backplanes, comprising a layer of carbon black on a PET film, to form experimental single pixel displays. No addition dopant was incorporated into either adhesive coating. The experimental displays were conditioned for 1 day at 50 percent relative humidity (as discussed in several of the aforementioned E Ink patents and applications, the electro-optic properties of electrophoretic displays vary with the moisture content of the electrophoretic layer, and hence it is desirable to condition test specimens under standard conditions prior to testing).

The electro-optic properties of the experimental displays were then tested by driving them to their black and white optical states using 250 millisecond pulses at various voltages, measuring the reflectances of the black and white optical states, and converting these reflectances to conventional L* values, where L* has the usual CIE definition:

$$L^* = 116(R/R_0)^{1/3} - 16,$$

where R is the reflectance and $R_0$ is a standard reflectance value. Table 1 below shows the dynamic range (the difference between the L* values of the black and white optical states) achieved at various voltages:

TABLE 1

| Lamination adhesive neutralizing agent | Voltage (V) | Dynamic range (L*) |
|---|---|---|
| Triethylamine (Control) | 7.5 | 7.1 |
|  | 10 | 14.1 |
|  | 12.5 | 20.0 |
|  | 15 | 24.4 |
| Tetrabutylammonium hydroxide (Present Invention) | 7.5 | 21.5 |
|  | 10 | 30.7 |
|  | 12.5 | 35.4 |
|  | 15 | 37.7 |

It will be seen from Table 1 that the lamination adhesive of the present invention showed substantially greater dynamic range at all drive voltages than the control adhesive. This improvement is consistent with that expected from a difference in conductivity, and is similar to that found using a prior art doped adhesive of lower acid content. The control adhesive, neutralized with triethylamine, shows the electro-optic response expected for a very resistive lamination adhesive. Visual inspection of the displays during operation showed that the display with the control adhesive showed only a small amount of blooming at the edge of the display, whereas the display using the adhesive of the present invention displayed a large amount of blooming. A high degree of blooming is also consistent with an adhesive of high conductivity.

The experimental displays were also subjected to low temperature testing. As discussed in several of the aforementioned E Ink patents and applications, the electro-optic performance of electrophoretic displays tends to fall off rapidly at low temperatures, at least partially because the conductivity of lamination adhesives falls with temperature. To determine the low temperature behavior of the experimental display of the present invention, the display was driven at temperatures from +25 to −25° C. using 15 V pulses of either 250 or 500 millisecond duration, and the dynamic range was determined, using reflectance values taken 2 minutes after the end of the drive pulse. (This 2 minute pause before taking the reflectance value allows certain short-term effects which affect the reflectance value to dissipate.) The reflectance values obtained were converted to a dynamic range value in the same way as before, and the results are shown in Table 2 below.

TABLE 2

| Temperature ° C. | Drive pulse (ms)) | Dynamic range (L*) |
| --- | --- | --- |
| 25 | 250 | 35.1 |
| 15 | 250 | 35.8 |
| 5 | 250 | 33.4 |
| −5 | 250 | 25.5 |
| −5 | 500 | 31.2 |
| −15 | 500 | 20.2 |
| −25 | 500 | 4.4 |

From the data in Table 2, it will be seen that the adhesive of the present invention provides adequate performance down to about −10° C., provided that pulse length compensation is used, i.e., provided the drive pulses are lengthened at low temperatures. This low temperature performance is comparable to that of a highly doped prior art lamination adhesive.

EXAMPLE 4: PURIFICATION OF LAMINATION ADHESIVE OF THE PRESENT INVENTION BY DIALYSIS

A sample (49.3 g, 35% wt. solids) of the lamination adhesive prepared in Example 1 above was placed in a tube of dialysis membrane (Fisher (Registered Trade Mark) regenerated cellulose membrane, MWCO 3500). After closing both ends of the tubing with clamps, the tubing was immersed in a continually replenished, stirred tank of water for about 4 hours. At then end of this time, 61.6 g of material was recovered, with a solids content of 29.5% (95% recovery). Initially, the NMP content was 4.4%; after dialysis, the content was 1.4%. The NMP content may be used as a surrogate for the removal of other water-soluble, low molecular weight materials.

Preliminary long term storage tests on displays using the dialyzed lamination adhesive prepared in Example 4 above with prior art lamination adhesives, both dialyzed and non-dialyzed, and proprietary organic semiconductor backplanes, indicated that the dialyzed lamination adhesive of the present invention had substantially better long term storage characteristics than the prior art adhesives.

EXAMPLE 5: USE OF DIALYZED BINDER AND LAMINATION ADHESIVE IN ELECTROPHORETIC DISPLAYS

A polyurethane latex was synthesized substantially as described in Example 2 of U.S. Patent Application Publication No. 2008/0074730, and was used as a binder in experiments described below. A second polyurethane latex was synthesized substantially as described in Example 2 of U.S. Patent Application Publication No. 2005/0107564 and was used as the lamination adhesive in these experiments.

Experimental single pixel displays were prepared substantially as described in Example 7 of U.S. Pat. No. 7,002,728, but using the aforementioned binder and lamination adhesive; the lamination adhesive was doped with 180 ppm of tetrabutylammonium hexafluorophosphate. Four sets of the experimental displays were produced, as follows:
  (A) Neither binder nor lamination adhesive was dialyzed;
  (B) The binder was dialyzed substantially as described in Example 4 above, but the lamination adhesive was not dialyzed;
  (C) The binder was not dialyzed but the lamination adhesive was dialyzed substantially as described in Example 4 above; and
  (D) Both the binder and the lamination adhesive were dialyzed substantially as described in Example 4 above.

The electro-optic properties of the four sets of experimental displays were then tested substantially as described in Example 7 of U.S. Pat. No. 7,002,728, but using 300 millisecond pulses of ±15V, and the extreme white and dark state reflectances were measured and converted to CIE L* units. The results are shown in the FIG. 2 of the accompanying drawings. In each set of readings, the left-hand bar represents the extreme white state of the display, the center bar represents the extreme dark state, and the right-hand bar represents the dynamic range (i.e., the difference between the extreme white and dark states, measured in L* units).

Figure 2:
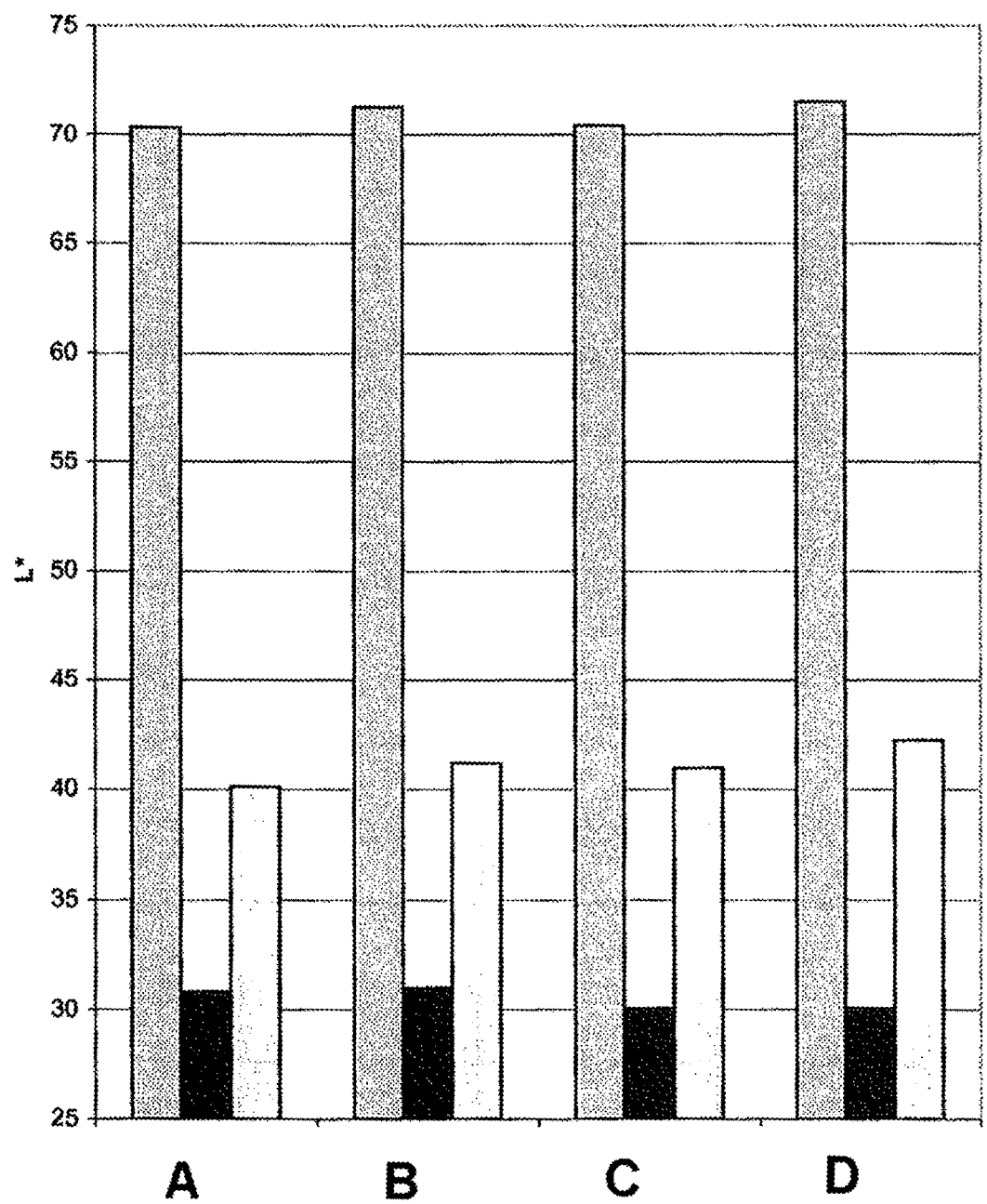
FIG. 2 is a graph showing the optical state readings obtained in Example 5 below.

It will be seen from FIG. 2 that the dialysis of the binder and lamination adhesive had no adverse effect on the electro-optic properties of the displays. Indeed, the two displays (B and D) in which the binder was dialyzed showed an improved white state, the displays C and D showed an improved dark state (improvement of the dark state is of course represented by a lower L* value). The display D, in which both the binder and the lamination adhesive were dialyzed, showed the greatest dynamic range of the four sets of displays.

The electro-optic testing was repeated using ±15V pulses of 100 and 500 millisecond duration, and ±10V, 100, 300 and 500 millisecond pulses. In all cases, the results obtained were consistent with those shown in FIG. 2.

When front plane laminates containing the binder and lamination adhesive combinations mentioned under (A)-(D) above were laminated to backplanes using organic transistors, it was observed that the front plane laminates containing undialyzed binder caused rapid degradation of the organic transistors whereas front plane laminates containing dialyzed binder did not. A similar but smaller effect was noted using dialyzed lamination adhesive.

From the foregoing, it will be seen that the present invention can provide lamination adhesives which provide electro-optic characteristics and low temperature performance comparable to those of prior art adhesives while avoiding the use of fugitive ionic species which can damage certain backplanes, and potentially lead to other problems.

It will be apparent to those skilled in the art that numerous changes and modifications can be made in the specific embodiments of the invention described above without departing from the scope of the invention. Accordingly, the whole of the foregoing description is to be interpreted in an illustrative and not in a limitative sense.

The invention claimed is:

1. An electro-optic assembly comprising an adhesive layer and a layer of electro-optic material, the adhesive layer comprising a polymeric adhesive material which has been subjected to dialysis or diafiltration to remove organic species having a molecular weight less than about 3,500.

2. An electro-optic assembly comprising an adhesive layer and a layer of electro-optic material, the adhesive layer comprising a polymeric adhesive material having a content of N-methylpyrrolidone not exceeding about 500 ppm based upon the total weight of the adhesive layer and layer of electro-optic material.

3. An electro-optic assembly according to claim 2 wherein the polymeric adhesive material comprises a polyurethane.

4. An electro-optic assembly according to claim 2 having a content of N-methylpyrrolidone not exceeding about 200 ppm.

5. An electro-optic assembly according to claim 4 having a content of N-methylpyrrolidone not exceeding about 100 ppm.

6. An electro-optic assembly according to claim 2 wherein the electro-optic material comprises a rotating bichromal member or electrochromic material.

7. An electro-optic assembly according to claim 2 wherein the electro-optic material comprises an electrophoretic material comprising a plurality of electrically charged particles disposed in a fluid and capable of moving through the fluid under the influence of an electric field.

8. An electro-optic assembly according to claim 7 wherein the electrically charged particles and the fluid are confined within a plurality of capsules or microcells.

9. An electro-optic assembly according to claim 7 wherein the electrically charged particles and the fluid are present as a plurality of discrete droplets surrounded by a continuous phase comprising a polymeric material.

10. An electro-optic display according to claim 7 wherein the fluid is gaseous.

11. An electro-optic display, front plane laminate, inverted front plane laminate or double release film comprising an electro-optic assembly according to claim 2.

12. An electronic book reader, portable computer, tablet computer, cellular telephone, smart card, sign, watch, shelf label or flash drive comprising an electro-optic display according to claim 11.

13. An electrophoretic medium comprising a continuous phase and a discontinuous phase, the discontinuous phase comprising a plurality of droplets, each of which comprises a suspending fluid and at least one particle disposed within the suspending fluid and capable of moving through the fluid upon application of an electric field to the electrophoretic medium, the continuous phase surrounding and encapsulating the discontinuous phase and comprising a polymeric binder which has been subjected to dialysis or diafiltration to remove organic species having a molecular weight less than about 3,500.

14. An electrophoretic medium comprising a continuous phase and a discontinuous phase, the discontinuous phase comprising a plurality of droplets, each of which comprises a suspending fluid and at least one particle disposed within the suspending fluid and capable of moving through the fluid upon application of an electric field to the electrophoretic medium, the continuous phase surrounding and encapsulating the discontinuous phase and comprising a polymeric binder having a content of N-methylpyrrolidone not exceeding about 1000 ppm based upon the weight of the electrophoretic medium.

* * * * *